United States Patent [19]
Tominaga

[11] 4,035,472
[45] July 12, 1977

[54] PROCESS FOR PRODUCING DIAMOND

[75] Inventor: Hiroshi Tominaga, Yokohama, Japan

[73] Assignee: Tokyo Sharyo Seizo Kabushiki Kaisha, Yokohama, Japan

[21] Appl. No.: 603,472

[22] Filed: Aug. 11, 1975

Related U.S. Application Data

[63] Continuation-in-part of Ser. No. 398,459, Sept. 18, 1973, abandoned.

[30] Foreign Application Priority Data

Sept. 18, 1972  Japan .............................. 47-93492

[51] Int. Cl.² ........................................ C01B 31/06
[52] U.S. Cl. ................................................ 423/446
[58] Field of Search ........................ 423/446; 264/3

[56] References Cited

U.S. PATENT DOCUMENTS

| | | | |
|---|---|---|---|
| 2,995,776 | 8/1961 | Giardini et al. | 423/446 |
| 3,401,019 | 9/1968 | Cowan et al. | 423/446 |
| 3,499,732 | 3/1970 | Garrett | 423/446 |
| 3,667,911 | 6/1972 | Balchan et al. | 423/446 |

FOREIGN PATENT DOCUMENTS

822,363  10/1959  United Kingdom ............... 423/446

OTHER PUBLICATIONS

Perry "Chemical Engineers Handbook," 3rd Edition, 1950, p. 235.

*Primary Examiner*—Edward J. Meros
*Attorney, Agent, or Firm*—Blum, Moscovitz, Friedman & Kaplan

[57] ABSTRACT

Industrial diamond powder is prepared from a mixture of graphite and a non-metallic material which is semi-transparent to thermal radiation by projecting a solid body against said mixture at a velocity which lies between the sonic wave propagation velocity of said graphite and said semi-transparent material. The shock collision provides the high pressure and temperature rise necessary for conversion of graphite to diamond and the semi-transparent material provides for sufficiently rapid cooling to prevent reversion of the formed diamond powder to graphite.

17 Claims, 4 Drawing Figures

PROCESS FOR PRODUCING DIAMOND

CROSS-REFERENCE TO RELATED APPLICATION

This application is a continuation-in-part application of Ser. No. 398,459, filed Sept. 18, 1973 for PROCESS FOR PRODUCING DIAMOND, now abandoned.

BACKGROUND OF THE INVENTION

The problem of producing diamond synthetically from carbon, and, more specifically, from graphite has been under attack for a substantial period of time, and, currently, there are two methods which have successfully produced diamond from carbon. One of these is the static method which, although operative, requires the use of complex and expensive equipment to generate the high temperatures and pressures which phase studies have shown are necessary for the conversion of carbon to diamond. A further difficulty with the static method is that the equipment is so complex and massive that the capacity has been extremely limited.

The second method which has been used for the conversion of carbon to diamond depends upon an extremely high-rate shock. The shock-synthesis technique is described in U.S. Pat. No. 3,238,019, which issued on Mar. 1, 1966. According to this patent, a block of carbon is explosively shocked as a result of which extremely high reaction temperatures and pressures are generated, but the yields of diamond were essentially unsatisfactory. It is believed that the low yields obtained using this technique result from reversion of the diamond to carbon, in consequence of the release of shock pressure occurring while the temperature is still high enough so that the diamond is converted to carbon which is the more stable phase when the pressure is released.

Cowan et al. in U.S. Pat. No. 3,401,019 which issued on Sept. 10, 1968, stated that in order to avoid reversion of the diamond produced in shock-synthesis to carbon, it was necessary to cool the reaction product rapidly to below 2000° C, and preferably, to below about 1800° C. For this purpose, they propose to prepare a reaction mixture consisting of carbon with a cooling medium having a high thermal conductivity. Under such circumstances, the rate of cooling of the diamond particles formed would be sufficiently high to prevent excessive graphitization of the diamond particles, the term "graphitization" evidently referring to reversion of diamond particles to graphite. It should be noted that the presence of the adjective "excessive" indicates that some graphitization is unavoidable.

Cowan et al. state that the type of carbon used is not critical but that graphite is generally preferred. A suitable cooling medium is iron, and, in fact, the iron and graphite can be in the form of cast iron. In this form, the carbon particles are mixed in intimate contact with the cooling medium so that heat transfer across the interface between the two phases should be excellent. For this particular combination, diamond is estimated to be produced at a temperature of about 3200° K when carbon having a density of about 1.70 g/cc is shocked to 400 kilobars. Also, diamond is believed to be produced at 2700° K when the carbon is shocked to 300 kilobars.

A critical property for the cooling medium is its shock impedance. Shock impedance is the ratio of the change in applied pressure to the change in material velocity. When the change in pressure is due to an impact which produces a shock wave, the shock impedance is equal to the initial density of the material multiplied by the velocity of the shock wave passing through it, so that the shock impedance is a function of the pressure.

The better cooling media are those having a high shock impedance, say about $3 \times 10^6$ dyne - sec/cm$^3$ or higher and a high heat capacity, preferably in excess of 0.1 cal/g/° C.

Where the cooling is to take place by heat transfer, the cooling medium should be as free of porosity as possible and generally should have a density of at least 85%, and preferably at least 90% of theoretical.

Phase studies have shown that diamond becomes thermodynamically unstable when the pressure falls to below about 100 kilobars. If the conditions under which dynamic conversion is carried out are such that the pressure stays above this limit for a longer period, then less rapid cooling can be effective. However, when the pressure falls below that at which the diamond is the thermodynamically stable phase, the diamond will revert rapidly to graphite, the decomposition being more rapid the higher the temperature and the lower the pressure. Therefore, it is highly preferable that cooling take place as rapidly as possible so that the temperature may drop below about 2000° C while the pressure is still above 100 kilobars.

Cowan et al. estimate that the cooling time should be less than 0.1 seconds and where the reaction conditions are such that a maximum diamond temperature substantially above 2000° C is reached, even shorter cooling times will be required these being on the order of about 1 millisecond or less. To achieve such rapid rates of cooling, they proprose that the carbon constitute no more than about 85% by volume of the reaction mixture, and where the cooling media are porous, the carbon should constitute no more than 65% by volume of the mixture.

In addition to iron as a suitable cooling medium, other metals are proposed, examples being copper, nickel, aluminum, manganese, etc.

Cowan et al. also propose that the cooling medium have a higher shock impedance than the carbon, such a relationship involving less stringent cooling requirements. Reaction mixtures are prepared by compacting carbon powder and metal shot. The mixture can also be prepared as a casting.

The cooling medium can serve to cool the diamond particles only if the temperature to which the cooling medium is raised by the shock is well below the equilibration temperature of 2000° C or 1800° C. It is for this reason that it is necessary that the shock impedance of the cooling medium be high.

It will be noted that the various metals proposed as cooling media have melting points below the reversion temperature, and well below the reaction temperature for conversion of graphite to diamond. Consequently, the cooling process depends not only on temperature rise of the cooling medium but on fusion as well. It would be desirable that the specific heat as well as the heat of fusion for the various metals be as high as possible. While the specific heats are approximately 0.1 cal/g/° C, heats of fusion are only about 3–5 kcal/mol. Consequently, the change of phase from solid to liquid for the various metals cannot contribute greatly to the cooling effect. A further difficulty is the fact that heat transfer by conduction is a relatively slow process. Since there is some porosity in the system, especially where the graphite and the metal are admixed by compression, there is some heat transfer from the surface of the diamond particles to the exterior of the metal particles by radiation, but, since the metals are highly opaque, heat transfer from the exterior to the interior of metal particles proceeds entirely by conduction.

It is suggested that the yields obtained by shock-synthesis have been limited by the fact that quenching is not sufficiently rapid when quenching depends upon heat transfer by conduction.

SUMMARY OF THE INVENTION

A mixture of powdered graphite with calcium carbonate, or glass powder which has been previously made semi-transparent, or quartz or similar non-metallic powdered material is subjected to a collision with a dense body such as iron where the velocity of the dense body immediately prior to collision with said powder mixture lies between the sonic wave propagation velocity of graphite and that of said admixed powdered material. The semi-transparency of said non-metallic materials refers particularly to infra-red radiation. Semi-transparency can be conferred on material such as glass by the addition of finely dispersed metallic oxides, sulphides or metals where these additives are selected to be insoluble in said glasses. Suitable glasses are soda-lime glass, borosilicate glass, lead glass and opal glass. The purpose of the semi-transparency is to increase the rate at which the temperature of the graphite drops.

The transmissibility of a material may be defined as the fraction of the luminous flux falling on a sheet of 1mm thickness which passes therethrough. A suitable transmissibility range for cooling media in accordance with the present invention is from about 0.2 to about 0.8, and a preferable range is from 0.3 to 0.7, the most desirable range being from 0.3 to 0.6. Materials having a transmissiblity between 0.2 and 0.8 are considered to be semi-transparent for the purposes of the present invention.

Accordingly, an object of the present invention is an improved method for the preparation of diamond powder by the use of shock.

Another object of the present invention is an improved method for the production of diamond powder from graphite where the graphite is mixed with an essentially non-metallic, semi-transparent material such as calcium carbonate, glass or quartz.

A further object of the present invention is an improved process for the production of diamond powder from graphite where said graphite is mixed with a semi-transparent, non-metallic material having a sonic wave propagation velocity substantially higher than that of graphite.

An important object of the present invention is an improved process for the manufacture of diamond powder from graphite wherein said graphite is mixed with an essentially non-metallic, semi-transparent material having a sonic wave propagation velocity substantially greater than that of graphite and wherein said mixture is subjected to shock by means of a projectile travelling at a velocity intermediate the sonic wave projection velocities of graphite and said material.

Still other objects and advantages of the invention will in part be obvious and will in part be apparent from the specification.

The invention accordingly comprises the several steps and the relation of one or more of such steps with respect to each of the others thereof, which will be exemplified in the process hereinafter disclosed, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

A preferred material for use in combination with powdered graphite for converting said powdered graphite into diamond powder is calcium carbonate powder. This material is semi-transparent to thermal, i.e., infra-red radiation and has a sonic wave propagation velocity substantially higher than that of graphite. The sonic wave propagation velocity, also known as the dilatational wave velocity, varies with the specific material. For graphite it is about 2,000 m/sec and for calcium carbonate it is about 6,000 m/sec. High speed shock against a solid material generates either a shock wave or a dilatational wave therein depending on the sonic wave propagation velocity of said material and the speed of the projectile directed thereagainst, giving rise, in either case, to the generation of an elevated pressure due to compression of the material. This pressure may amount to as much as 300,000 atmospheres and is accompanied by a rapid temperature rise to a high temperature in the case of a shock wave, but adequately high pressure or temperature cannot be obtained by simple compression. The high pressure, obviously, is not continuously maintained but is reached as a maximum for an instant at a given point in the material followed by pressure relaxation.

EXAMPLE 1

Figure 3:
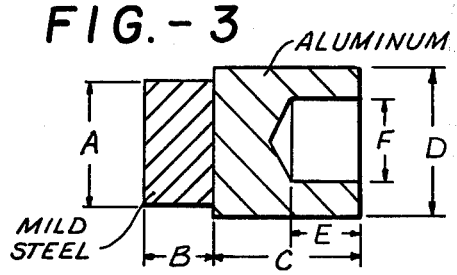
FIGS. 3 and 4 are sectional views of projectiles used in the process of the present invention.

In a preferred embodiment of the present invention, a powder mixture consisted of 7% of graphite powder and 93% of calcium carbonate powder, both by weight. A projectile constructed as shown in FIG. 3 and having the following dimensions (in mm) was prepared:

| | |
|---|---|
| A | 5.2 |
| B | 3.0 |
| C | 6.0 |
| D | 5.7 |
| E | 3.0 |
| F | 3.5 |

The projectile weighed 0.83 grams and was accelerated to a speed of 3,030 m/sec and impacted against a compacted pellet of the powder mixture weighing 0.204 g. It is to be noted that the projectile speed of 3,030 m/sec lies between the sonic wave propagation velocities of graphite powder and calcium carbonate. The energy transmitted by the projectile was 389 kg·m and the momentum was 257 g·sec.

The resultant shock wave generated both high pressure and high temperature in the graphite, thereby converting same into diamond. So far as the calcium carbonate is concerned, the collision at about 3,000 m/sec, being slower than the sonic wave propagation speed in calcium cabonate (6,000 m/sec.), does not generate a shock wave therein, but rather a dilatational wave which is not accompanied by generation of high pressure or high temperature. Consequently, in the case of the powder mixture of graphite and calcium carbonate, the compression wave passes through the calcium carbonate powder at a higher rate than through the graphite so that there is no significant increase in pressure or temperature in the calcium carbonate from the passage of the compression wave therethrough. The diamond formed from the graphite at high temperature as the result of the shock wave therein is surrounded by the calcium carbonate powder, the latter being at a lower temperature than the diamond and being semi-transparent to thermal radiation. The thermal radiation from the hot diamond powder is rapidly absorbed by the calcium carbonate and the extent of reversion of diamond to graphite during the cooling process is substantially decreased, providing a high yield of diamond powder.

In accordance with the present invention, heat absorption takes place not only on the surface of the calcium carbonate particles but also in the interior thereof as a result of the fact that the calcium carbonate is semi-transparent to thermal or infra-red radiation so that direct penetration of the radiation into the interior of the particles is possible. Consequently, effective heat transfer from the diamond to the calcium carbonate takes place rapidly resulting in rapid quenching of the diamond formed. It should be noted that a completely transparent material would not be nearly so effective for rapid cooling of the diamond since the thermal radiation would not be absorbed by the transparent material but would merely pass therethrough. In such a case, graphite particles sandwiching transparent material would exchange radiation since the transparent material would absorb little of said radiation. Cooling would then take place primarily by conduction, a relatively slow process. The other extreme as a heat absorber for cooling the diamond would be an opaque material. Such a material would absorb radiation only at the exterior surface thereof which would rapidly rise to the temperature of the diamond, but the interior of the opaque material would receive heat only slowly by conduction, so that it would be ineffective for rapid cooling of the diamond powder produced.

From the above discussion it is evident that it is important to employ a semi-transparent material as the non-metallic adjunct to the graphite. Calcium carbonate given as an example is particularly suitable as the adjunct since it is easily available as by crushing natural marble. Furthermore, it is easily soluble in acid; this property facilitates the separation of the calcium carbonate from the diamond powder since addition of an inexpensive acid such as muriatic acid results in the production of calcium chloride which is extremely soluble in water so that treatment of the mixture of diamond powder and calcium carbonate produced by the process of the present invention with dilute muriatic acid makes available an easy and inexpensive separation of the diamond powder from the residual material.

As is evident, the efficiency of the conversion of graphite to diamond will depend on a number of factors such as thre ratio of semi-transparent adjunct to graphite, the sonic wave propagation velocity in the ajunct, the weight and velocity of the projectile with which the powder mixture is shocked and the form of the mass of the powder mixture body. Table 1 shows a number of suitable mixtures of semi-transparent powder and graphite and suitable collision speeds at which the powder mixture is to be shocked.

TABLE 1

| Semi-transparent powder | Collision speed | Mixing ratio (wt. %) | |
|---|---|---|---|
| Calcium carbonate | 3,000 m/sec | Graphite | 4 |
|  |  | $CaCO_3$ | 96 |
| Calcium carbonate | 4,000 m/sec | Graphite | 9 |
|  |  | $CaCO_3$ | 91 |
| Quartz | 3,500 m/sec | Graphite | 7 |
|  |  | Quartz | 93 |
| Quartz | 3,000 m/sec | Graphite | 3 |
|  |  | Quartz | 97 |
| Calcium carbonate | 4,000 m/sec | Graphite | 15 |
|  |  | $CaCO_3$ | 85 |
| Glass powder | 3,000 m/sec | Graphite | 8 |
|  |  | Glass powder | 92 |
| Glass powder | 3,000 m/sec | Graphite | 5 |
|  |  | Glass powder | 95 |

As Table 1 shows, calcium carbonate can be replaced by semi-transparent mineral crystals such as quartz which is available as rock crystal and powdered glass which has been rendered semi-transparent. Powdered glass compositions which are suitable are soda-lime glass, borosilicate glass, opal glass and lead glass. To render these glasses semi-transparent, they are melted, and finely divided metals, metal oxides or metal sulphides are mixed therein. Preferably, the degree of division should be such that the added materials are present as colloids. After cooling, the materials are powdered in preparation for mixing with graphite. Artifical quartz can also be used in which case the same procedure can be used to render it semi-transparent.

Preferably, the collision speed with which the powder mixture is shocked is selected to be approximately the average of the sonic wave propagation velocites in graphite and in the semi-transparent powder material. As the Table shows, the graphite should comprise from about 3 to about 15% by weight of the mixture. The weight of the projectile is not critical, but should be commensurate with the charge of powder to be impacted.

Figure 1:
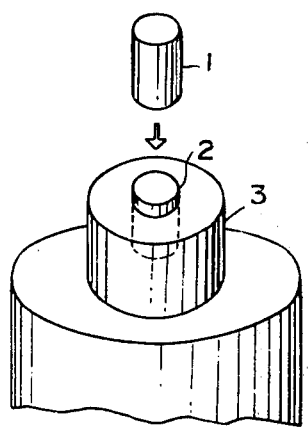
FIG. 1 is a perspective view of a projectile and a preform of a powder mixture in a support, said projectile being directed toward said powder mixture preform.
Figure 2:
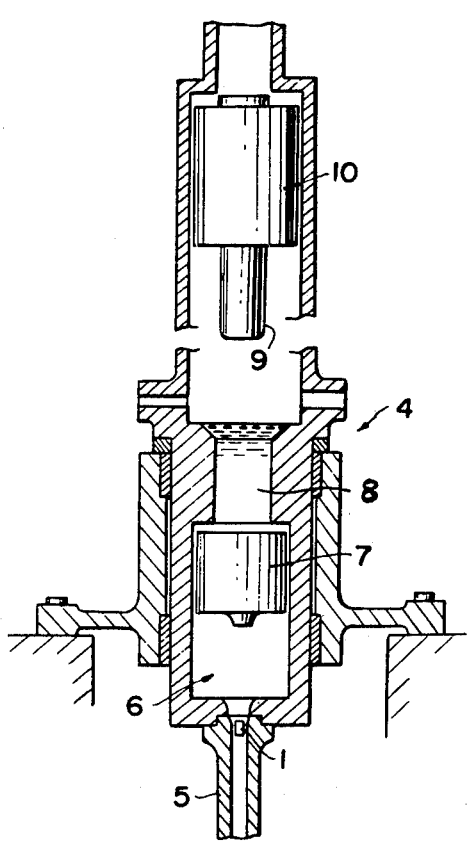
FIG. 2 is a vertical sectional view in reduced scale of an apparatus for projecting a solid body against a preform of a powder mixture.

Although not completely necessary, it is preferably to preform the powder into a form such as is shown in FIG. 1 using a conventional press to facilitate the handling of the material and to facilitate transmission of the shock wave caused by collision of the projectile with the powder compact. In FIG. 1, the projectile is represented by the reference numeral 1. The powder mixture 2 is firmly supported by supporting member 3 which is constructed to be sufficiently rigid so that it is immobile even during and after the collision with projectile 1. An apparatus for accelerating the projectile to the desired high velocity is shown in FIG. 2. Hammer 10 carries plunger 9 dhown into hydraulic pressure chamber 8. Hydraulic pressure generator 4 forces piston 7 downward compressing the gas in chamber 6 as the result of which solid body 1 is driven through barrel 5 and accelerated to the requisite velocity on striking preform 2 in supporting member 3. Preform 2 is, of course, a mixture of graphite and the selected semi-transparent powdered material.

In designing the projectile, it is desirable that it be light in weight and that the forward end be of a material having a high shock impedance. The projectile is generally cylindrical in shape. Steel or tungsten are suitable for the forward end of the projectile, but can damage the interior of barrel 5 by high speed frictional contact therewith. Accordingly, it is desirable to decrease the diameter of the forward end of the projectile so that there is clearance between said forward end and the barrel interior.

As for the rearward end of the projectile, suitable materials are light metals and synthetic resins which cannot damage the barrel 5. Examples of such materials are aluminum, magnesium and the synthetic resins of which ABS is particularly suitable. If the projectile is driven at sufficiently high velocity, the entire projectile may be of aluminum.

Recess 12 in the projectile is provided to decrease the weight of same and to provide an elastic expansion of the projectile in the barrel, thereby preventing bypassing of the projectile by the compressed gas driving the projectile.

EXAMPLE 2

A pellet weighing 0.358 grams was prepared from a powder mix containing 10% by weight of graphite from Ceylon, the graphite having an average grain size of 10 $\mu$ and 90% by weight of calcium carbonate also having an average grain size of 10 $\mu$. The diameter of the pellet was 7.0 mm and the thickness thereof was 3.5 mm.

Figure 4:
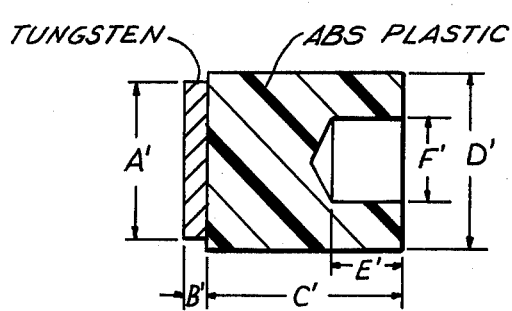
Figure 4:
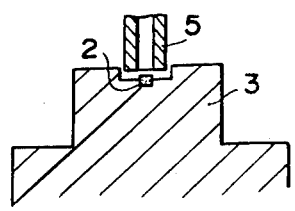

Now referring to FIG. 2, the weight of hammer 10, including the weight of plunger 9 and 45 kg and the weight of piston 7 was 12 kg. The pneumatic pressure applied above hammer 10 was 15 bars, gauge. The eak hydraulic pressure generated in the hydraulic pressure chamber 8 was 1570 bars, gauge. The peak helium gas pressure generated in chamber 6 was 3,400 bars, gauge. The shape and structure of the essentially cylindrical projectile used are shown in FIG. 4. The dimensions (in mm) were as follows:

| | |
|---|---|
| A' | 6.4 |
| B' | 1.0 |
| C' | 8.0 |
| D' | 7.0 |
| E' | 3.0 |
| F' | 3.5 |

The weight of the projectile was 0.92 grams and its velocity at impact against the pellet 2 was measured at 2,900 m/sec. The quantity of diamond powder produced was 0.006 grams which corresponds to 0.03 carats. The yield based on the weight of diamond powder to graphite powder used was 16.6%. Using a Debye-Scherrer method camera with a Cu-K2 target at an electric pressure of 30 KVP (30 Kilovolts), and a current of 15 mA and an exposure time of 3 hours, an X-ray diffraction photograph was obtained. Examination of the photograph showed that the values derived therefrom corresponded closely with those of diamond.

As indicated by Table 1, the weight percentage of graphite in the various mixtures is relatively low. Since the densities of the various semi-transparent materials are but little greater than that of graphite, it follows that the volume percentage of graphite in the various mixtures is also relatively low. Consequently, the mixtures may be viewed as being essentially a two-phase system with the semi-transparent material being the continuous phase and the graphite the discontinuous phase. In othe words, each graphite particle is essentially surrounded by semi-transparent material which can serve to absorb heat rapidly from the graphite.

The particle size of neither the graphite nor the admixed semi-transparent material is critical. Ball-milling may be used for reducing calcium carbonate or glass to a convenient size or for mixing the graphite therewith. The size of the diamond powder produced ranges from tens to hundreds of microns.

It has been found that the process for the present invention, namely propelling a solid body against a powder mixture of graphite and a semi-transparent material at a velocity which lies between the sonic wave propagation velocity in graphite and in the semi-transparent material used therewith results in improvided production yield of diamond, improved production efficiency and lower production costs.

It will thus be seen that the objects set forth above, among those made apparent from the preceding description are efficiently attained, and, since certain changes may be made in carrying out the above process without departing from the spirit and scope of the invention, it is intended that all matter contained in the above description shall be interpreted as illustrative and not in a limiting sense.

It is also to be understood that the following claims are intended to cover all of the generic and specific features of the inventin herein described, and all statements of the scope of the invention, which, as a matter of language, might be said to fall therebetween.

What is claimed is:

1. A process for the production of diamond powder comprising the steps of preparing a mixture of graphite and a non-metallic material which is semi-transparent to infra-red radiation and has a sonic wave propagation veocity higher than that of graphite, the optical characteristics of said non-metallic material being such that infra-red radiation is absorbed in the interior of particles of said material, said graphite and non-metallic material being in powder form, and projecting a solid body against said mixture, said solid body having a velocity immediately prior to collision with said powder mixture intermediate the sonic wave propagation velocities of graphite and said non-metallic material, said solid body having sufficient mass and kinetic energy at said velocity to raise the temperature of the graphite to the range in which diamond is the stable form of carbon.

2. The process as defined in claim 1, wherein said non-metallic material is selected from the group consisting of calcium carbonate, glass and quartz, said glass and quartz including sufficient coloring material therein to render same semi-transparent.

3. The process as defined in claim 1, wherein said non-metallic material is calcium carbonate.

4. The process as defined in claim 2, wherein said coloring material is selected from the group consisting of finely-divided oxides, sulphides and metals insoluble in said glass and quartz.

5. The process as defined in claim 1, wherein the ratio of graphite to semi-transparent material lies between about 3:97 and 15:85 by weight.

6. The process as defined in claim 1, further comprising the step of preforming said mixture prior to projecting said solid body against same.

7. The process as defined in claim 6, wherein said mixture is preformed into a cylinder.

8. The process as defined in claim 1, wherein said solid body has a forward end and a rearward end, said forward end being of a material having a high shock impendance and said rearward end being of a light, rigid material.

9. The process as defined in claim 8, wherein said forward end is of a material selected from the group consisting of tungesten, steel, iron and aluminum.

10. The process as defined in claim 8, wherein said rearward end is of a material selected from the group consisting of aluminum, magnesium, and synthetic organic resins.

11. The process as defined in claim 8, wherein said forward end is of mild steel and said rearward end is of aluminum.

12. The process as defined in claim 8, wherein said forward end is of tungesten and said rearward end is of ABS plastic.

13. The process as defined in claim 8, wherein said solid body is projected through a barrel against said mixture, the diameter of the rearward end of said body being such as to essentially close said barrel during transit thereof and the diameter of said forward end being sufficiently smaller than the interior of said barrel to avoid contact therewith during said transit.

14. The process as defined in claim 2, wherein said glass is selected from the group consisting of soda-lime glass, opal glass, borosilicate glass and lead glass.

15. The process as defined in claim 1, further comprising the step of ball-milling together said graphite and said semi-transparent material as a means of forming said powder mixture.

16. The process as defined in claim 1, wherein said semi-transparent material is $CaCO_3$ and said solid body is projected against said powder mixture at a velocity in excess of about 2000 m/sec. and below about 6000 m/sec.

17. The process as defined in claim 1, wherein said semi-transparent material is $CaCO_3$ and said solid body is projected against said powder mixture at a velocity of about 3000 m/sec.

* * * * *